W. A. FINLEY.
REBOUND CHECK.
APPLICATION FILED MAR. 25, 1916.
1,250,929.  Patented Dec. 18, 1917.
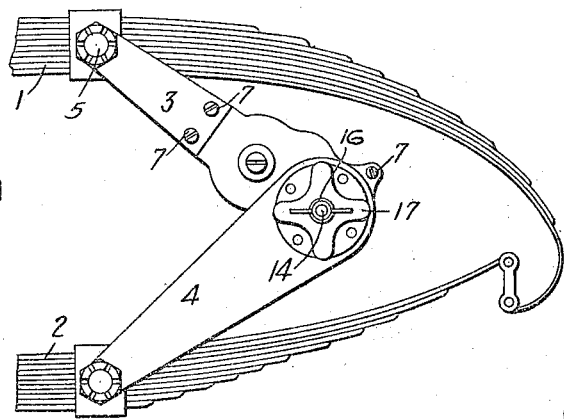
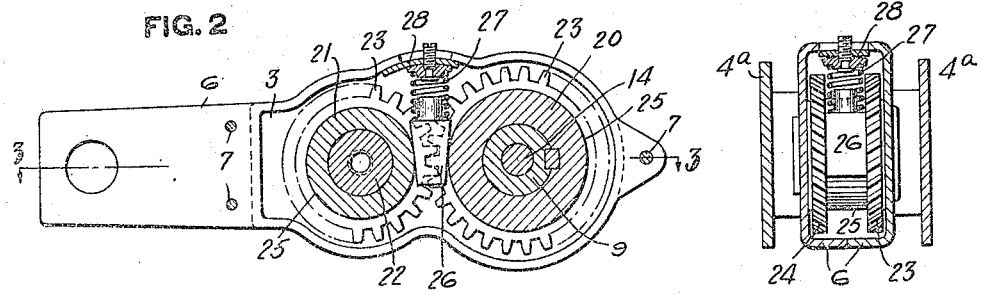
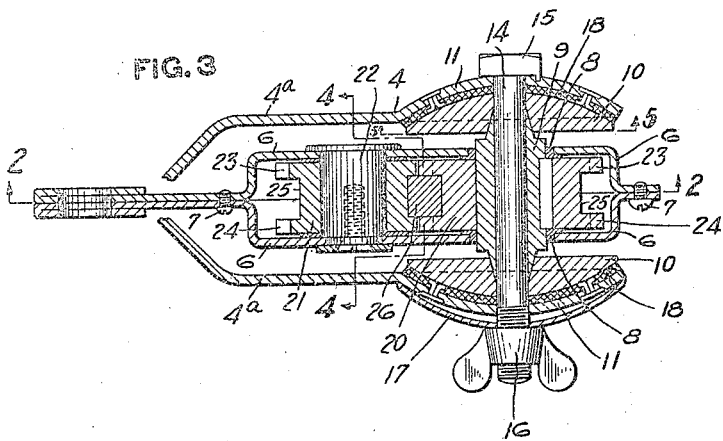
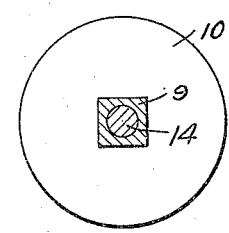
WITNESSES
INVENTOR
Walter Arthur Finley
By Fred'k W. Winter.
Attorney.

UNITED STATES PATENT OFFICE.

WALTER ARTHUR FINLEY, OF FAIRMONT, WEST VIRGINIA, ASSIGNOR TO PERCY E. DONNER, OF PITTSBURGH, PENNSYLVANIA.

REBOUND-CHECK.

1,250,829.　　　　Specification of Letters Patent.　　Patented Dec. 18, 1917.

Application filed March 25, 1916. Serial No. 86,650.

*To all whom it may concern:*

Be it known that I, WALTER ARTHUR FINLEY, a resident of Fairmont, in the county of Marion and State of West Virginia, have invented a new and useful Improvement in Rebound-Checks, of which the following is a specification.

This invention relates to rebound checks adapted to be arranged between any two parts movable with respect to each other, and particularly adapted for automobile and similar vehicle use, to restrain and retard the action of the vehicle springs.

The object of the invention is to provide a device of the character specified which is of simple construction, which can be cheaply fabricated and readily applied to a vehicle or other device, which is durable and cannot get out of order, and by means of which the extent of the restraint of the vehicle springs can be quickly and readily adjusted or varied.

The invention comprises the construction and arrangement of parts hereinafter described and claimed.

In the accompanying drawings, Figure 1 is a side elevation showing the device in operative relation to the springs of an automobile; Fig. 2 is a vertical longitudinal section on the line 2—2, Fig. 3; Fig. 3 is a horizontal section on the line 3—3, Fig. 2; Fig. 4 is a vertical transverse section on the line 4—4, Fig. 3; and Fig. 5 is a sectional view on the line 5—5, Fig. 3.

In the drawings the rebound check is shown applied to an automobile in which 1 indicates any part of the frame or body of the automobile, shown in this case as the upper spring member, while 2 indicates any portion of the running gear, shown in this case as the lower member of the spring supporting the body or frame on the axle. These parts may be of any design or construction and the attachment of the rebound check thereto is merely indicated diagrammatically.

The rebound check comprises two members designated as an entirety by the reference letters 3 and 4 both of which are shown substantially in the form of levers having their free ends connected by pivots 5 or other suitable means to the two parts of the vehicle respectively. These connections may be made in any desired or approved manner.

The member 3 is shown as formed from two stampings, 6, 6 suitably connected together, such as by screws or the like 7, and shaped to form the casing for a chamber therebetween. Journaled in these casing members at one end of the member 3, in suitable bearings 8 is a hollow shaft 9, whose ends project outside of the casing on both sides and are squared or otherwise formed to have non-rotatably secured thereto friction disks 10, each forming one member of a friction clutch or brake. The outer faces of these disks are preferably slightly conical as shown, and fit into cup or cone shaped portions 11 on the inner ends of two lever arms 4ª, the outer or free ends of which are bent toward each other and brought into contact, and which lever arms collectively form the member 4. The lever arms 4ª and the disks 10 are held in place, and the friction between the disks 10 and the cups 11 is adjusted, by means of a bolt 14 extending through the hollow shaft 9 and provided on one end with a head 15 on its opposite end being threaded to receive a winged nut 16 bearing against a spring washer 17 which in turn bears against the outer face of one of the lever arms 4ª. Obviously, the bolt and nut hold the parts in place, and by merely turning said winged nut, the pressure between the disks 10 and cups 11 can be varied so as to vary the friction or braking effect between said disks and cups. Preferably a suitable friction lining, such as brakeband-lining 18 is provided on either said disks or in said cups, being shown as secured by rivets in said cups,—for the purpose of increasing the frictional or braking effect.

Suitably secured to the shaft 9 within the casing formed by the members 6, 6 is a gear 20 (shown as keyed to the shaft 9), which meshes with a similar gear 21 rotatable idly on a stud 22 extending between the side walls of the casing. These gears may be plain spur gears, but preferably each will be a double gear, that is provided with two rows of teeth 23 and 24 with plane faces or hubs 25 therebetween. Preferably the teeth 23 and 24 are helical or inclined, with the spiral or inclination of the two rows of each gear running in opposite directions, in order to reduce noise and prevent lost motion.

Suitable means are provided for locking these two gears together, such locking means being shown as a wedge 26 extending between the plane faces or hubs 25 of said gears from one side and being pressed inwardly between said hubs by means of a spring 27 interposed between the outer end of the wedge and a removable cap 28 closing an opening through the top of the casing through which access can be had to said spring and wedge. Suitable packing is preferably placed between the two members 6, 6 forming the casing so as to make the same grease-tight, and in operation preferably the gears in said casing will be packed in grease so as to reduce wear and friction and prevent noise.

The parts above described are so arranged that whenever the free ends of the two levers 3 and 4 move toward each other, such for instance, as when the vehicle body descends, due to compression of the springs, the gear 21 will merely roll idly around gear 20, so that practically no resistance whatsoever is offered to the downward movement of the vehicle body. When, however, the vehicle body moves in the opposite direction, such as occurs on account of rebounds when the vehicle strikes a rough spot in the road, the separation of the free ends of the two lever members causes the wedge 26 to lock the two gears 20 and 21, together, so that the further upward movement of the vehicle body, producing further separation of the free ends of the two lever members 3 and 4, causes the gear 21 to carry with it the gear 20 and thus rotate the shaft 9. This produces rotary movement of the disks 10 in the cups 11, and this rotary movement is resisted by the friction or braking effect existing between said disks and cups. The tighter the winged nut 16 has been set, the greater is this frictional retardation to the rotary movement of the disks. Consequently the upward rebound of the vehicle body is restrained to the extent of this frictional braking effect, and the vehicle body is thereby prevented from being thrown violently upwardly. When, however, the vehicle body reaches the upward limit of its movement, it will settle gradually without any retardation or hindrance whatsoever from the rebound device.

The rebound device described does not interfere with the easy riding of the vehicle, as the compression of the vehicle springs is in no way interferred with. It does, however, prevent violent upward pitching of the vehicle body, as above described.

The rebound device described can be readily applied to any vehicle, or to any other device in which there are two parts moving toward and from each other. The particular device illustrated and described is an improvement upon my Patent No. 1,040,917, granted October 8, 1912.

What I claim is:—

1. A rebound check comprising two members movable relative to one another and each adapted to be attached to a portion of a vehicle frame, means movable relative to one of said members and arranged to frictionally engage the same, a second means carried by the other member and arranged to move positively with the first means and relative to said other member, and means comprising a wedge normally biased by a spring between adjacent smooth surfaces on the two movable means to lock said means together without lost motion when the members are moved relative to one another in one direction but permitting free relative movement of the members when moved in the other direction.

2. A rebound check comprising two members movable relative to one another and each adapted to be attached to a portion of a vehicle frame, means arranged to rotate relative to one of said members and frictionally engage the same, a second rotatable means carried by the other member and arranged to rotate positively with the first means and relative to the other member, and means comprising a wedge normally biased by a spring into frictional engagement with adjacent smooth surfaces on the two rotatable means to lock said means together without lost motion when the two members are moved relative to one another in one direction but permitting free relative movement of the members in the other direction.

3. A rebound check comprising two members movable relative to one another and each adapted to be attached to a portion of a vehicle frame, means arranged to rotate relative to one of the members and frictionally engage the same, said means including a gear, a second gear carried by the other member and arranged to rotate with the first and relative to said other member, and means comprising a wedge normally biased by a spring into engagement with adjacent smooth surfaces on the gears to lock said gears together without lost motion when the members are moved relative to one another in one direction but permitting free relative movement of the gears when the members are moved relative to each other in the other direction.

4. A rebound check comprising two members movable relative to one another and each adapted to be attached to a portion of a vehicle frame, a gear housed within one of the members and attached to friction disks arranged to frictionally engage the other member, a second gear housed within the first member and arranged to move with it and meshing with the first gear, and means comprising a wedge normally biased by a spring into frictional engagement with adjacent smooth surfaces on the gears to lock said gears together without lost motion when the members are moved relative to one another in one direction but permitting free relative movement of the gears when the members are moved relative to each other in the other direction.

5. A rebound check comprising a member having spaced arms at one of its ends, a shaft to which said arms are attached, a gear journaled on said shaft between the arms and provided with means for frictionally engaging their inner surfaces, a member journaled to rotate about the same axis as said gear and housing the same, a gear carried by said member and housed thereby, and means comprising a wedge normally biased by a spring into frictional engagement with adjacent smooth surfaces on the gears to lock said gears together without lost motion when the members are moved relative to one another in one direction but permitting free relative movement of the gears when the members are moved relative to one another in the opposite direction.

6. A rebound check comprising a member arranged to be attached to a vehicle frame and having spaced friction disks, a shaft on which said disks are journaled, a gear journaled on said shaft between the disks and provided with means for frictionally engaging them, a member having one of its ends arranged to be attached to another vehicle part and having its other end hollow and arranged to oscillate about the axis of the shaft and to house the gear, a second gear journaled in said second member and housed by the hollow end thereof, said second gear meshing with the first, and means comprising a wedge normally biased by a spring into frictional engagement with adjacent smooth surfaces on the gears to lock said gears together when the members are moved relative to one another in one direction but permitting free relative movement of the gears when the members are moved relative to each other in the opposite direction.

7. A rebound check comprising a member arranged to be attached to a vehicle frame and having spaced hemispherically shaped friction disks, a shaft on which said disks are journaled, a gear journaled on said shaft carrying hemispherically shaped members complementary to the disks and arranged to frictionally engage their inner faces, a member mounted to oscillate about the axis of said shaft and arranged to house the gear, a second gear carried by said second member and housed thereby, said second gear meshing with the first and both of said gears having annular recesses in their peripheral faces, and means comprising a wedge normally biased by a spring into frictional engagement with the adjacent surfaces of the annular recesses to lock the gears together without lost motion when the members are moved relative to one another in one direction but permitting free relative movement of the gears when the members are moved relative to one another in the opposite direction.

8. A rebound check comprising a member carrying a shaft, a rotatable means journaled on said shaft and arranged to frictionally engage said member, a second member journaled to rotate about the axis of said shaft and carrying a rotatable means arranged to positively rotate with the first means and relatively to said second member, said second rotatable means having a smooth surface adjacent a smooth surface on the first rotatable means, and means comprising a wedge normally biased by a spring into engagement with the adjacent smooth surfaces on the two rotatable means to lock said two means together without lost motion when the two members are moved relative to one another in one direction but permitting free relative movement of the members in the other direction.

9. A rebound check comprising a member carrying a shaft, means journaled on said shaft and arranged to frictionally engage said member, said means including a gear, a second member pivoted to rotate about the axis of said shaft, a gear carried by said second member meshing with the first gear and arranged to rotate relative to said second member, and a wedge normally biased by a spring into engagement with adjacent smooth surfaces on said gears to lock the gears together when the members are moved relative to one another in one direction but permitting free rotation of the gears and free relative movement of the members in the other direction.

10. A rebound check comprising a member arranged to be attached to a vehicle frame and having two oppositely disposed friction surfaces, a rotatable means including friction disks arranged to frictionally engage the surfaces on the first member and also including a rotatable member connected to the friction disks, and a third member located between the faces of the first member and arranged to oscillate about the same axis as the rotatable member, and carrying means arranged to lock it to the rotatable member when moved in one direction but permitting free movement in the other direction, said third member serving to house the means carried by it and the rotatable member of the rotatable means.

11. A rebound check provided with a friction device comprising two rotatable disks with a gear between them, an arm having one of its ends arranged to be attached to a vehicle frame and the other end pivoted to rotate about the same axis as the friction device, a gear carried by said arm meshing with the gear of the friction device, means for locking said gears together when the arm is moved in one direction but permitting free movement of the arm in the other direction, said arm being arranged to house both of said gears, and a second member adapted to be attached to a vehicle frame having friction surfaces arranged to engage the friction disks of the friction device externally of the housed portion thereof.

12. A rebound check comprising a member arranged to be attached to a vehicle frame and having two oppositely disposed friction surfaces, a rotatable means having friction disks arranged to engage the surfaces of the first member and including a gear located between the disks, a second member pivoted to rotate about the same axis as the rotatable means and between the disks thereof, said second member carrying a gear meshing with the first gear, locking means including a wedge normally biased between adjacent smooth surfaces on the two gears to lock them rigidly together when the second member is moved in one direction but permitting free movement of the member in the opposite direction, said second member serving to house both of said gears and the locking means.

13. A rebound check adapted to be arranged between two parts of a vehicle and comprising two members arranged for attachment to the two vehicle parts respectively, one of said members being a lever connected by one end to one of the vehicle parts, a hollow shaft journaled in one of said members, friction disks on the ends of said shaft, the opposite member being double and being provided with friction disks cooperating with the friction disks on the shaft, an adjustable tie member extending through said hollow shaft and said friction disks and serving to exert pressure of said disks against each other and to thereby connect the said shaft to the opposite member, and means completely incased in the member in which said shaft is journaled and serving to lock said shaft against rotation when the vehicle parts move away from each other and for releasing said shaft when the vehicle parts move toward each other.

14. A rebound check adapted to be arranged between two parts of a vehicle and comprising two lever members, a hollow shaft journaled in one of said lever members, a friction disk on each end of said shaft, the opposite lever member being double and having a friction disk on one end of each of its parts and cooperating with the friction disk on said shaft, an adjustable tie member extending through said hollow shaft and said friction disks and serving to connect the one lever member to said hollow shaft and to produce friction between said disks, the opposite ends of said lever members being connected to the two vehicle parts respectively, and means completely incased in the member in which said shaft is journaled and serving to lock said shaft against rotation when the vehicle parts move away from each other and for releasing said shaft when the vehicle parts move toward each other.

15. A rebound check adapted to be arranged between two parts of a vehicle and comprising a casing for attachment to one vehicle part, a hollow shaft journaled in said casing, a friction disk on each end of said shaft, a double lever member connected by one end to the other vehicle part, a pair of friction disks on the opposite end of said lever member and cooperating with the friction disks on the shaft, an adjustable tie member extending through said hollow shaft and said disks and serving to connect said lever member to said shaft and to exert pressure between said friction disks, and means in said casing for locking said shaft against rotation when the vehicle parts move away from each other and for releasing said shaft when the vehicle parts move toward each other.

16. A rebound check adapted to be arranged between two parts of a vehicle and comprising two members arranged for attachment to the two vehicle parts respectively, one of said members being a lever connected to one end of one of the vehicle parts, a hollow shaft journaled in one of said members, friction disks on the ends of said shaft, the opposite member being double and being provided with friction disks cooperating with the friction disks on the shaft, an adjustable tie member extending through said hollow shaft and said friction disks and serving to exert pressure of said disks against each other and to thereby connect the said shaft to the opposite member, a gear secured to said shaft, a second gear journaled on the other of said members and mounted to oscillate in engagement with the first named gear and to be rotated thereby, and means on one side of the point of contact of said gears for engaging between the same to lock said gears against rotation when the vehicle parts move away from each other and for freely permitting rotation of said gears when said vehicle parts move toward each other.

17. A rebound check adapted to be arranged between two parts of a vehicle and comprising two lever members, a hollow shaft journaled in one of said lever members, a friction disk on each end of said shaft, the opposite lever member being double and having a friction disk on one end of each of its parts and cooperating with the friction disks on said shaft, an adjustable tie member extending through said hollow shaft and said friction disks and serving to connect the one lever member to said hollow shaft, and to produce friction between said disks, the opposite ends of said lever members being connected to the two vehicle parts respectively, a gear secured to said shaft, a second gear journaled on one of said members and mounted to oscillate in engagement with the first named gear and to be rotated thereby, and means on one side of the point of contact of said gears for engaging between the same to lock said gears against rotation when the vehicle parts move away from each other and for freely permitting rotation of said gears when said vehicle parts move toward each other.

18. A rebound check adapted to be arranged between two parts of a vehicle and comprising a casing for attachment to one vehicle part, a hollow shaft journaled in said casing, a friction disk on each end of said shaft, a double lever member connected by one end to the other vehicle part, a pair of friction disks on the opposite end of said lever member and coöperating with the friction disks on the shaft, an adjustable tie member extending through said hollow shaft and said disks and serving to connect said lever member to said shaft and to exert pressure between said friction disks, a gear in said casing on said shaft, a second gear mounted in said casing to oscillate in engagement with the first named gear and to be rotated thereby, and means in said casing on one side of the point of contact of said gears for engaging between them and preventing their rotation when the vehicle parts move away from each other and to permit free rotation of said gears when the vehicle parts move toward each other.

In testimony whereof, I have hereunto set my hand.

WALTER ARTHUR FINLEY.

Witnesses:
 GLENN H. LERESCHE,
 A. E. JOHNSON.